US009372883B2

(12) United States Patent
An et al.

(10) Patent No.: US 9,372,883 B2
(45) Date of Patent: Jun. 21, 2016

(54) MANIPULATION OF MULTI-TENANCY DATABASE

(71) Applicant: International Business Machines Corporation, Armonk, NY (US)

(72) Inventors: Wen Hao An, Beijing (CN); Bo Gao, Beijing (CN); Chang Jie Guo, Beijing (CN); Ning Wang, Beijing (CN); Qi Rong Wang, Beijing (CN); Xiao Feng Wang, Beijing (CN); Zhi Hu Wang, Beijing (CN); Lei Zhi, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 13/954,179

(22) Filed: Jul. 30, 2013

(65) Prior Publication Data

US 2014/0040294 A1 Feb. 6, 2014

(30) Foreign Application Priority Data

Jul. 31, 2012 (CN) .......................... 2012 1 0271433

(51) Int. Cl.
*G06F 17/30* (2006.01)
(52) U.S. Cl.
CPC .... *G06F 17/30386* (2013.01); *G06F 17/30289* (2013.01); *G06F 17/30424* (2013.01)
(58) Field of Classification Search
None
See application file for complete search history.

(56) References Cited

U.S. PATENT DOCUMENTS

| 2005/0223022 | A1* | 10/2005 | Weissman et al. ............. 707/102 |
| 2009/0030906 | A1* | 1/2009 | Doshi et al. ....................... 707/9 |
| 2010/0299664 | A1 | 11/2010 | Taylor et al. |
| 2011/0106789 | A1 | 5/2011 | Gao et al. |
| 2011/0276584 | A1 | 11/2011 | Cotner et al. |
| 2011/0302212 | A1* | 12/2011 | Agrawal et al. ............... 707/793 |

(Continued)

FOREIGN PATENT DOCUMENTS

| CN | 101777161 A | 7/2010 |
| CN | 102236762 A | 11/2011 |
| CN | 102456028 A | 5/2012 |

OTHER PUBLICATIONS

Wang, et al, "A Collaborative Monitoring Mechanism for Making a Multitenant Platform Accountable," Proceedings of HotCloud 2010; Jun. 22-25, 2010, Boston, MA; 7 pages.

*Primary Examiner* — Robert Beausoliel, Jr.
*Assistant Examiner* — Pedro J Santos
(74) *Attorney, Agent, or Firm* — Cantor Colburn LLP; Terry Carroll

(57) ABSTRACT

Embodiments relate to manipulating a multi-tenant database, wherein the multi-tenant database comprises one or more source databases for storing tenant data. An aspect includes receiving a database operation request for one or more tenant-specific logic views, wherein the tenant-specific logic views are created for respective tenants based on mapping information pointing to the one or more source databases included in the multi-tenant database and multi-tenant metadata. Another aspect includes acquiring the mapping information related to the database operation request and pointing to the one or more source databases included in the multi-tenant database. Yet another aspect includes performing a database operation corresponding to the database operation requested for the one or more source databases based on the acquired mapping information.

17 Claims, 5 Drawing Sheets

(56) References Cited

U.S. PATENT DOCUMENTS

| | | |
|---|---|---|
| 2011/0307450 A1 | 12/2011 | Hahn et al. |
| 2012/0030168 A1* | 2/2012 | Weissenberger et al. ..... 707/611 |
| 2012/0042384 A1 | 2/2012 | Badhwar et al. |
| 2012/0066755 A1 | 3/2012 | Peddada et al. |
| 2013/0055118 A1* | 2/2013 | Donovan et al. .............. 715/763 |

* cited by examiner

MANIPULATION OF MULTI-TENANCY DATABASE

PRIORITY

This application claims priority to Chinese Application No. 201210271433.1, filed 31 Jul. 2012, and all the benefits accruing therefrom under 35 U.S.C. §119, the contents of which in its entirety are herein incorporated by reference.

TECHNICAL FIELD

The present disclosure relates to a multi-tenancy database system, and more particularly to manipulation of a multi-tenancy database.

DESCRIPTION OF THE RELATED ART

Multi-tenancy technology has increasingly attracted people's interest in recent years. Multi-tenancy technology refers to running an instance of software on a service provider's server so that the instance provides services for a plurality of client organizations (namely tenants), particularly middle and small-sized clients. It is possible that data of a number of (e.g., above 1 million) middle and small-sized tenants in a large-scale multi-tenant application scenario are physically distributed in different source databases.

In these source databases, the current multi-tenancy technology usually employs a sharing or storage/isolation mode of multiple kinds of physical database. FIG. 1 schematically illustrates a block diagram of a physical data sharing or storage/isolation mode in a source database of a multi-tenant system. As shown in FIG. 1, the following three modes might be included, for example:

1. An independent database mode in which every tenant possesses his own individual database. This mode exhibits the highest subscriber data isolation level and optimal safety. However, this mode increases the installation number of the database and thereby brings about an increase of maintenance cost and purchase cost. Utilization of hard disk and memory space is not high, and furthermore, as the number of tenants increases, and the level of accessibility to the data of the whole system will be remarkably degraded. The independent database mode is adapted for an application scenario in which there are fewer tenants and the tenants are large-sized tenants.

2. Shared database and isolated data schema. In this mode, a plurality of tenants share the same database, each tenant possesses his own individual table and adopts his own schema. This mode may provide logical data isolation to a degree for tenants having a higher safety requirement.

3. Shared database and shared data schema. In this mode, a plurality of tenants share the same table in the same database and adopt the same schema. A "tenant ID" field is recorded in each table of the table to distinguish data records of different tenants. This mode is a mode with the highest sharing degree and the lowest isolation level. Meanwhile, this mode exhibits low database maintenance and purchase cost and allows each database to support tenants with a large data amount.

Therefore, for example on a platform as a service (PaaS) platform supporting a plurality of tenants, each application will in fact have a plurality of source databases of tenant data organized in one or more kinds of the above physical data sharing or storage/isolation modes. There are various needs for tenant data operations in each source database. For example, when an independent software vendor (ISV) needs to operate the tenant data in each source database during application debugging, test and update, or when there is something wrong with the tenant data upon the running of applications, there is a need to repair data in a certain period of time to ensure the tenants' business. However, due to complexity of underlying modes and technologies of the source database, it is complicated and time-consuming to operate for the source database in the multi-tenant system in the current system.

SUMMARY

Embodiments relate to a method, system, and computer program product for manipulation of a multi-tenant database. An aspect includes wherein the multi-tenant database comprises one or more source databases for storing tenant data. Another aspect includes receiving a database operation request for one or more tenant-specific logic views, wherein the tenant-specific logic views are created for respective tenants based on mapping information pointing to the one or more source databases included in the multi-tenant database and multi-tenant metadata. Another aspect includes acquiring the mapping information related to the database operation request and pointing to the one or more source databases included in the multi-tenant database. Yet another aspect includes performing a database operation corresponding to the database operation requested for the one or more source databases based on the acquired mapping information.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENT

Embodiments of manipulation of a multi-tenancy database, with some exemplary embodiments being discussed below in detail.

Figure 2:
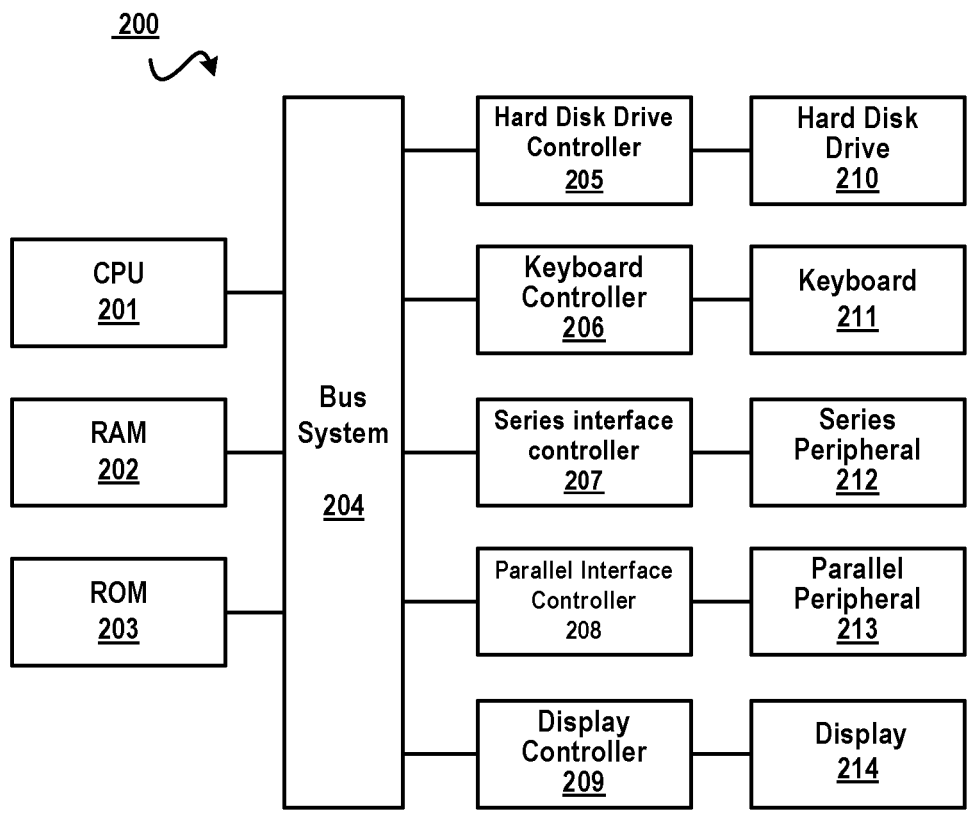
FIG. 2 illustrates a block diagram of an exemplary computer system that is applicable to implement the embodiments.

FIG. 2 illustrates a block diagram of an exemplary computer system 200 which is applicable to implement various embodiments of manipulation of a multi-tenancy database. As illustrated in FIG. 2, the computer system 200 may include: CPU (Central Process Unit) 201, RAM (Random Access Memory) 202, ROM (Read Only Memory) 203, System Bus 204, Hard Drive Controller 205, Keyboard Controller 206, Serial Interface Controller 207, Parallel Interface Controller 208, Display Controller 209, Hard Drive 210, Keyboard 211, Serial Peripheral Equipment 212, Parallel Peripheral Equipment 213 and Display 214. Among above devices, CPU 201, RAM 202, ROM 203, Hard Drive Controller 205, Keyboard Controller 206, Serial Interface Controller 207, Parallel Interface Controller 208 and Display Controller 209 are coupled to the System Bus 204. Hard Drive 210 is coupled to Hard Drive Controller 205. Keyboard 211 is coupled to Keyboard Controller 206. Serial Peripheral Equipment 212 is coupled to Serial Interface Controller 207. Parallel Peripheral Equipment 213 is coupled to Parallel Interface Controller 208. And, Display 214 is coupled to Display Controller 209. It should be understood that the structure as illustrated in FIG. 2 is for exemplary purposes only. In some cases, some devices may be added to or removed from the computer system 200 based on specific situations.

As will be appreciated by one skilled in the art, various embodiments of manipulation of a multi-tenancy database may be embodied as a system, method or computer program product. Accordingly, various embodiments of manipulation of a multi-tenancy database may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, various embodiments of manipulation of a multi-tenancy database may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for various embodiments of manipulation of a multi-tenancy database may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments of manipulation of a multi-tenancy database are described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Various embodiments of manipulation of a multi-tenancy database provide a uniform console for a multi-tenant database system so that an operator (administrator or an authorized tenant) may operate an underlying source database of the multi-tenant system through a familiar conventional user interface and an operation style. By using various embodiments of manipulation of a multi-tenancy database, the operator does not need learn about specific physical data sharing or storage/isolation mode of the underlying source database, thereby simplifying the procedure of the operator operating a plurality of source databases of the multi-tenant system.

Figure 3:
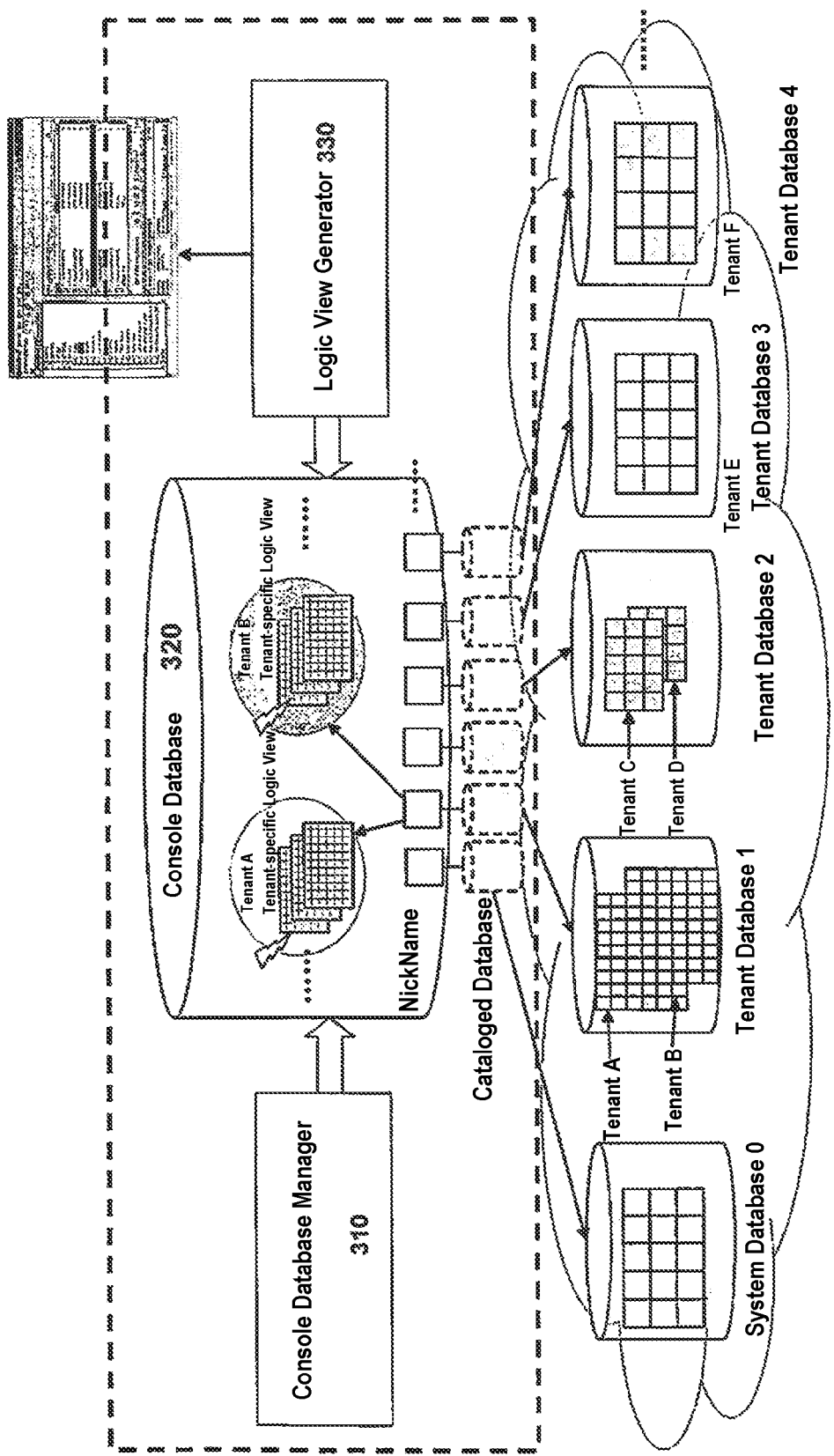
FIG. 3 illustrates a block diagram of a system for manipulating a multi-tenant database according to an embodiment.

FIG. 3 illustrates a block diagram of a system 300 for manipulating a multi-tenant database according to an embodiment.

As shown in FIG. 3, a system 300 for manipulating the multi-tenant database according to an embodiment comprises a console database manager 310, a console database 320 and a logic view generator 330.

The console database manager 310 is configured to perform a function of managing a plurality of source databases in the multi-tenant database system, including but not limited to establishing in the console database 320 mapping information pointing to the plurality of source databases of the multi-tenant database system. Establishing the above mapping information by the console database manager 310 further comprises maintaining the above mapping information, comprising: adding the mapping information upon establishing a new source database; correspondingly updating the established mapping information when the source database is changed; deleting the established mapping information when the source database is cancelled.

According to an embodiment, in an initialized stage, the console database manager 310 creates the console database 320 for the multi-tenant database. The console database manager 310 catalogs each of the source databases of the multi-tenant database and creates the mapping information for the cataloged source database to establish a database federation. For example, the console database manager 310 establishes the database federation by using table nick names corresponding to respective tables in the source database. Upon operation, when the source database of the multi-tenant database is changed (e.g., adding a new source database, cancelling the original source database, or changing the physical data sharing or storage/isolation mode, etc.), the mapping information is maintained correspondingly.

Figure 1:
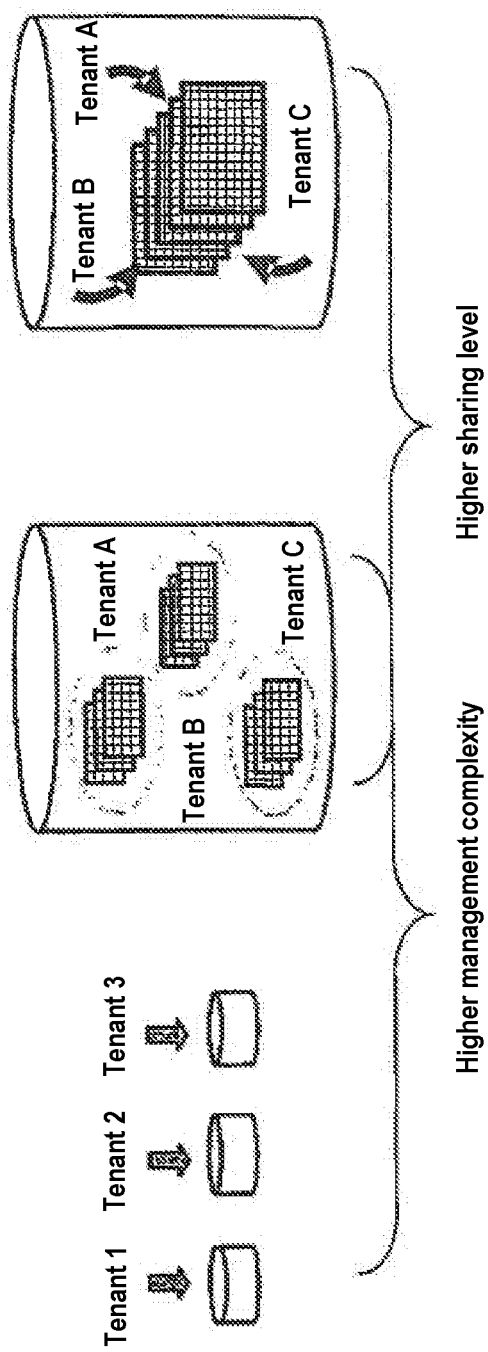
FIG. 1 schematically illustrates a block diagram of a physical data sharing or storage/isolation mode in a source database of a multi-tenant system.

The source database may comprise databases in which tenant data is stored, for example, databases 1-4 of a cloud database exemplarily illustrated in FIG. 3. The source database may further comprise a database in which system data is stored, for example, a database 0 in the source database exemplarily illustrated in FIG. 3. The source database may employ different data sharing or storage/isolation modes to achieve the storage of the multi-tenant data. For example, the storage/isolation mode employed by source database 1 is a shared database and shared data schema shown in FIG. 1, wherein a tenant A and a tenant B share the same table and employs the same schema. The data of different tenants are distinguished by recording "tenant ID" field in each table. The storage/isolation mode employed by the database 2 is a shared database and isolated data schema as shown in FIG. 1, wherein a tenant C and a tenant D share the same database, but the tenant C and the tenant D respectively have their own individual tables, and each tenant employs its own schema. The storage/isolation mode employed by the databases 3 and 4 is an independent database mode as shown in FIG. 1, wherein a tenant E individually uses the database 3, and a tenant F individually uses the database 4.

In order to provide a uniform and convenient control of the source database for the operator, the logic view generator 330 creates a tenant-specific logic view for each tenant based on the mapping information stored in the console database 320 and multi-tenant metadata (stored in a multi-tenant metabase (not shown)) so that the operator controls the corresponding metabase based on the tenant-specific logic view.

Particularly, as for the multi-tenant sharing table in the source database, the logic view created by the logic view generator 330 may independently reflect database logic of an individual tenant. For example, as for the tenant A and tenant B, the logic view generator 330 creates a tenant A-specific logic view and a tenant B-specific logic view respectively. Only the data record of the tenant A can be seen through the tenant A-specific logic view, and only the data record of the tenant B can be seen through the tenant B-specific logic view. As such, data isolation may also be effectively provided even for shared database/shared data schema at lower isolation levels.

According to an embodiment, the logic view generator 330 creates a tenant-specific logic view for each tenant based on federated table nick names in the console database and the multi-tenant metadata.

According to an embodiment, the multi-tenant metadata are stored in the multi-tenant metabase (not shown). The multi-tenant metadata may comprise correspondence relations of the tenants and the tables in the source database. In another example, in order to support application-specific multi-tenant database operation, the multi-tenant metadata may further comprise correspondence relations of specific applications and the tables. In a further example, the multi-tenant metadata may further comprise data isolation levels used by the respective tenants to provide information about the tenants' service levels. The multi-tenant metabase may be implemented as an individual database independent on the console database and/or multi-tenant cloud database, or implemented as a database achieved by combining the console database and/or multi-tenant cloud database.

According to an embodiment, the logic view generator 330 enables database operations for at least one created tenant-specific logic view.

According to an embodiment, an authentication module (not shown) of the system may authorize a specific user so that for example an independent software vendor having an administer right or an operator of an authorized tenant may perform database control of actual data of the corresponding tenants in the user interface based on the logic views, thereby concealing complexity of the underlying mode and technology of the source database.

In order to support the authorized user's database operation based on the logic views, in an embodiment the logic view generator 330 may create a corresponding trigger for a database operation of the logic view. In an implementation, with regard to the multi-tenant sharing table in the source database, the created triggers may be used to process a tenant ID row for insertion operation, deletion operation and the like, and create a two-segment type transaction for the updating of a system table spanning multiple background databases. Those skilled in the art may appreciate that the triggers and procedures may be defined based on other database operations of the logic views so as to enable database operation for at least one created tenant-specific logic view. Furthermore, the forms and contents of the triggers both may be changed according to specific database and needed functions.

In an embodiment, the complicated mode and technology of the underlying source database are concealed to the operator by means of the tenant-specific logic view. As such, the operator may perform database operation for the corresponding source database by performing conventional database operations only in a familiar conventional interface, thereby simplifying the procedure of the operator manipulating the plurality of source databases in the multi-tenant system.

A method for manipulating the multi-tenant database according to an embodiment is described with reference to FIG. 4 and FIG. 5.

Figure 4:
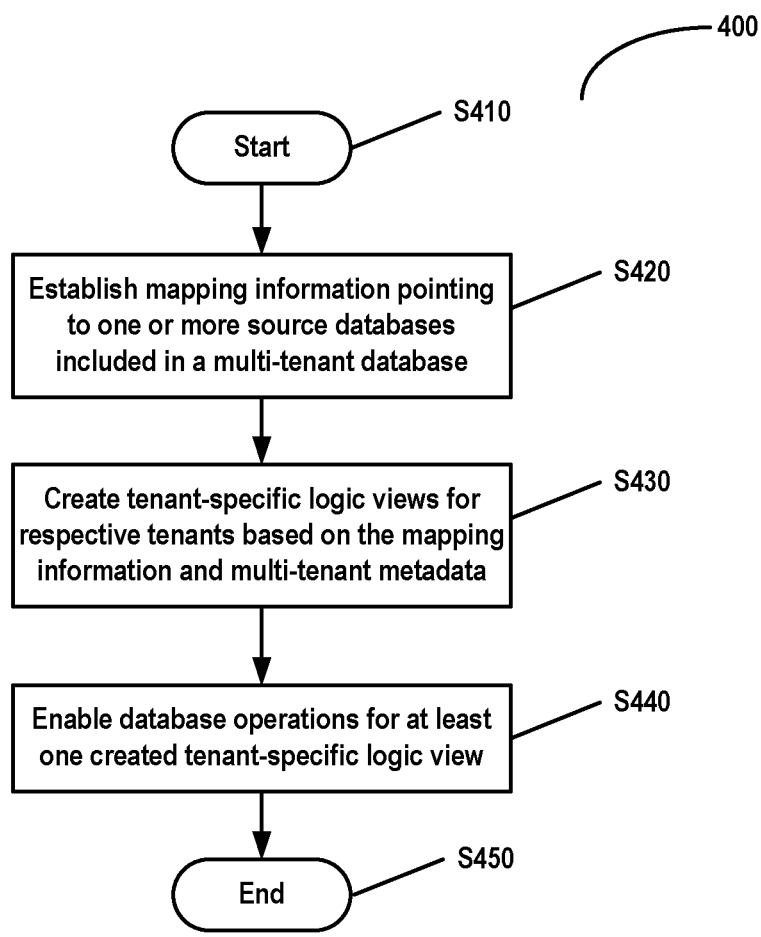
FIG. 4 illustrates a flow chart of a method for manipulating a multi-tenant database upon initialization according to an embodiment.

FIG. 4 illustrates a flow chart of a method 400 for manipulating a multi-tenant database upon initialization according to an embodiment.

As shown in FIG. 4, at step S410, the method for manipulating the multi-tenant database according to an embodiment begins.

At step S420 is established mapping information pointing to one or more source databases included in the multi-tenant database.

According to an embodiment, first, the console database is created for the multi-tenant database. The console database manager catalogs each of the source databases of the multi-tenant database and creates the mapping information for the cataloged source database to establish a database federation. For example, the console database manager establishes the database federation by using table names corresponding to respective tables in the source database. The source database may comprise a database in which tenant data are stored, or comprise a database in which system data are stored. The source database may employ different sharing or storage/isolation mode to achieve storage of the multi-tenant data.

At step S430, tenant-specific logic views are created for respective tenants based on the mapping information and multi-tenant metabase.

Particularly, in regard to the multi-tenant sharing table in the source database, the created logic view may independently reflect the database logic of an individual tenant.

According to an embodiment, tenant-specific logic views are created for respective tenants based on the table names of the federation in the console database and multi-tenant metadata.

According to an embodiment, the multi-tenant metadata may comprise correspondence relations of the tenants and the tables in the source database. In another example, in order to support application-specific multi-tenant database operation, the multi-tenant metadata may further comprise correspondence relations of specific applications and the tables. In a further example, the multi-tenant metadata may further comprise data isolation levels used by the respective tenants to provide information about the tenants' service levels.

At step S440, database operations for at least one created tenant-specific logic view is enabled.

A user with specific authorization, e.g., an independent software vendor having an administer right or an authorized tenant may perform database control of actual data of the corresponding tenants in the user interface based on the logic views, thereby concealing complexity of the underlying mode and technology of the source database.

In order to support the authorized user's database operation based on the logic views, in an embodiment a corresponding trigger is created for the database operation of the logic views. In an implementation, with regard to the multi-tenant sharing table in the source database, the created trigger may be used to process a tenant ID row for insertion operation, and create a two-segment type transaction for the updating of a system table spanning multiple background databases.

In an implementation mode, a specific example of creating a trigger for the insertion operation of the tenant data based on tenant table view is shown in Table 1, below:

TABLE 1

CREATE TRIGGER TTABLE_1 INSTEAD OF INSERT ON COMPANY0001.
TENTATABLE1 REFERENCING NEW AS n FOR EACH ROW call instnt( )
CREATE PROCEDURE instnt( ) LANGUAGE SQL BEGIN
    DECLARE SQLSTR VARCHAR(1024);--
    SET SQLSTOR='SET PASSTHRU TDB1';--
    EXECUTE IMMEDIATE SQLSTR;--
    SET SQLSTR='insert into tenanttable1
        values (51,"245","company0001")';--
    EXECUTE IMMEDIATE SQLSTR;--
END According to an embodiment of an implementation mode, a specific example of creating a trigger for the operation of deleting and updating system data based on a system table view is shown in Table 2, below:

TABLE 2

CREATE TRIGGER SYSTABLE_D INSTEAD OF DELETE ON SYSSCM
    SYSTABLE REFERENCING OLD AS o FOR EACH call delsys( )
CREATE TRIGGER SYSTABLE_U INSTEAD OF UPDATE ON SYSSCM
    SYSTABLE REFERENCING OLD AS o FOR EACH call upsys( )
CREATE PROCEDURE delsys( ) LANGUAGE SQL BEGIN
    DECLARE SQLSTR VARCHAR(1024);--
    SET SQLSTR='SET PASSTHRU SYSDB1';--
    EXECUTE IMMEDIATE SQLSTR;--
    SET SQLSTR='delete from db2admin.systable where id=1';--
    EXECUTE IMMEDIATE SQLSTR;--
    SET SQLSTR='SET PASSTHRU RESET';--
    EXECUTE IMMEDIATE SQLSTR;--
    SET SQLSTR='SET PASSTHRU TDB1';--
    EXECUTE IMMEDIATE SQLSTR;--
    SET SQLSTR='delete from db2admin.systable where id=1';--
    EXECUTE IMMEDIATE SQLSTR;--
    SET SQLSTR='SET PASSTHRU RESET';--
    EXECUTE IMMEDIATE SQLSTR;--
END
CREATE PROCEDURE upsys( ) LANGUAGE SQL BEGIN
    DECLARE SQLSTR VARCHAR(1024);--
    SET SQLSTR='SET PASSTHRU SYSDB1';--
    EXECUTE IMMEDIATE SQLSTR;--
    SET SQLSTR='update db2admin.systable set ip="qwe" where id=4';--
    EXECUTE IMMEDIATE SQLSTR;--
    SET SQLSTR='SET PASSTHRU RESET';--
    EXECUTE IMMEDIATE SQLSTR;--
    SET SQLSTR='SET PASSTHRU TDB1';--
    EXECUTE IMMEDIATE SQLSTR;--
    SET SQLSTR='update db2admin.systable set ip="qwe" where id=4';--
    EXECUTE IMMEDIATE SQLSTR;--
    SET SQLSTR='SET PASSTHRU RESET';--
    EXECUTE IMMEDIATE SQLSTR;--
END Those skilled in the art may appreciate that the trigger and procedure may be defined based on other database operations of the logic view so as to enable database operation for at least one created tenant-specific logic view. Furthermore, the form and content of the trigger both may be changed according to specific database and needed functions. Therefore, the above examples are presented only for illustration purpose not to limit the scope of the disclosure.

According to various embodiments, the system data in the multi-tenant database may be processed in a way similar to the tenant data as described above. This point may be made more apparent in combination with the specific example of a trigger for the operation of deleting and updating system data based on a system table view as described above. Therefore, in the method of manipulating the multi-tenant database as stated above, the system database/system table is not excluded, and conversely it should be understood that it is a solution including system database/system table processing.

At step S450, the method for manipulating the multi-tenant database according to an embodiment ends.

Figure 5:
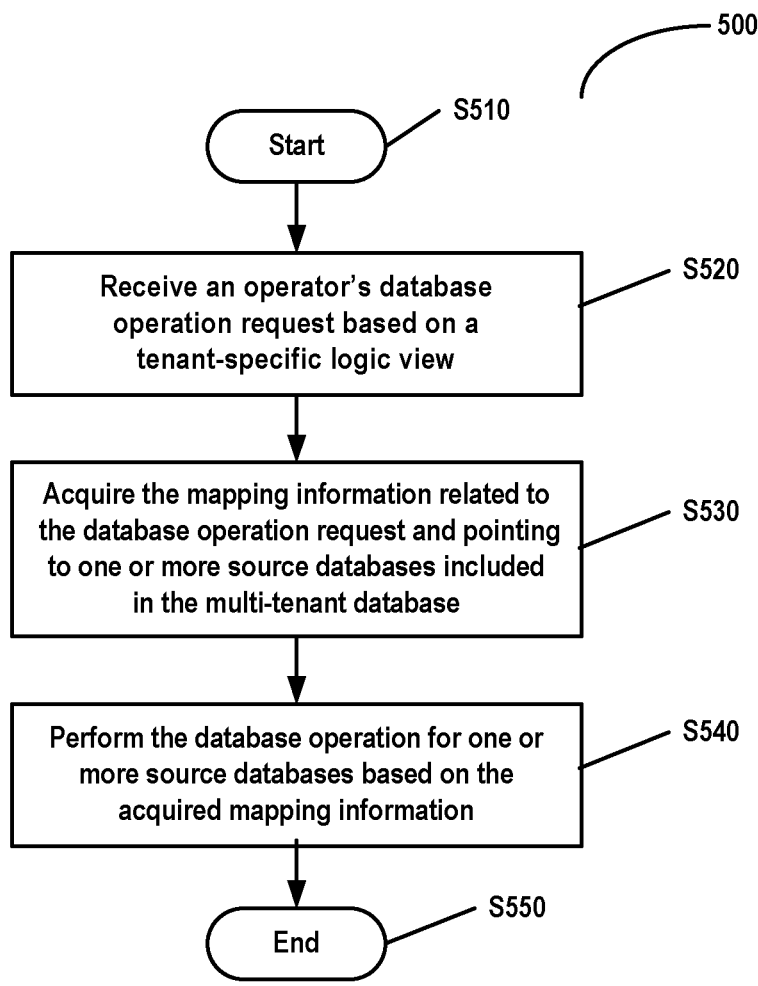
FIG. 5 illustrates a flow chart of a method for manipulating a multi-tenant database upon operation according to an embodiment.

FIG. 5 illustrates a flow chart of a method 500 for manipulating a multi-tenant database upon operation according to an embodiment.

At step S510, the method for manipulating the multi-tenant database in response to the operator's operation request for the database according to an embodiment begins.

At step S520, a database operation request for the tenant-specific logic view is received from the operator.

According to one or more embodiments, a user interface similar to customary database software is provided to the operator to display the tenant-specific logic view. The tenant-specific logic views are created for respective tenants by the logic view generator during initialization based on the mapping information stored in the console database and the multi-tenant metadata. Particularly, as for the multi-tenant sharing table in the source database, the created tenant-specific logic views may independently reflect database logic of an individual tenant. The operator may make various conventional data operation requests based on the tenant-specific logic views. For example, a request is made to add, modify and delete data items and the like in the logic view.

At step S530 is acquired mapping information related to the database operation request and pointing to one or more source databases included in the multi-tenant database.

According to various embodiments, during the initialization phase, a corresponding trigger may be created for the database operation of the logic view. The corresponding trigger is invoked in response to the database operation request for the tenant-specific logic view. The operator's database operation request for the tenant-specific logic view may be captured and interpreted by a specific trigger, whereby to acquire mapping information related to the database operation request and pointing to one or more source databases included in the multi-tenant database. The mapping information is stored in the console database. According to an embodiment, during the initialization phase, the mapping information is created by cataloging each of the source databases of the multi-tenant database and creating the corresponding mapping information for the cataloged source database to establish a database federation. In an embodiment, the mapping information may comprise the table nick names of the database federation.

At step S540, the database operation for one or more source databases is performed based on the acquired mapping information.

By the acquired mapping information, the database operation request for the tenant-specific logic view may be converted into the database operation for one or more corresponding source databases in the multi-tenant database. In an implementation, the trigger uses a specific storage procedure created whilst creating the trigger to receive the database operation request, and operate the source database according to the acquired mapping information.

For example, upon the database operation of deleting or updating the tenant-specific logic view, the transaction will be interpreted by the corresponding trigger. The trigger creates a corresponding database operation sentence for example according to the tenant ID for which the database operation is performed for the tenant-specific logic view, and invokes a deleting or updating procedure. When the insertion database operation is performed for the tenant-specific logic view, the transaction will be interpreted by the corresponding trigger. The trigger creates a corresponding database operation sentence for example according to the tenant ID and a new record entry value for which the database operation is performed for the tenant-specific logic view, and invokes an inserting procedure. These database operation procedures will receive the acquired mapping information pointing to one or more source databases included in the multi-tenant database as a parameter, uses information (e.g., the table names of the database federation) about the corresponding source database to replace the corresponding information in the created database operation sentences. Then, the database operation is performed in the corresponding source database.

At step S550, the method for manipulating the multi-tenant database in response to the operator's operation request for the database according to an embodiment ends.

It may be appreciated that a uniform multi-tenant database console having a familiar conventional interface is provided for the operator by establishing the tenant-specific logic view according to various embodiments, thereby concealing the complicated mode and technology of the underlying source database. The operator may implement the database operation for the respective tenants without need to learn about specific physical data sharing or storage/isolation mode of the source databases, thereby simplifying the procedure of the operator operating a plurality of source databases of the multi-tenant system.

Some embodiments have been discussed above in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of manipulating a multi-tenant database, wherein the multi-tenant database comprises a plurality of source databases for storing tenant data corresponding to a plurality of tenants, the method comprising:
  receiving a database operation request via a tenant specific logic view of a plurality of tenant-specific logic views, wherein the plurality of tenant-specific logic views each correspond to a respective tenant of the plurality of tenants based on mapping information pointing to the plurality of source databases included in the multi-tenant database and multi-tenant metadata, wherein the tenant-specific logic view includes a respective trigger configured to convert the database operation request received via the tenant specific logic view into a two-segment type transaction for updating of a system table spanning multiple databases of the plurality of source databases;

acquiring the mapping information related to the database operation request and pointing to the multiple databases of the plurality of source databases included in the multi-tenant database; and performing a database operation corresponding to the database operation request for the multiple databases of the plurality of source databases based on the acquired mapping information, wherein the performing comprises invoking the trigger.

2. The method according to claim 1, wherein the mapping information to the plurality of source databases is created by cataloging each of the source databases and creating the mapping information for the cataloged source database to establish a database federation.

3. The method according to claim 2, wherein the mapping information comprises table nick names of the database federation.

4. The method according to claim 1, wherein the multi-tenant metadata comprises correspondence relations of the tenants and one or more tables in the source database.

5. The method according to claim 1, wherein at least one of the source databases comprises a multi-tenant sharing table.

6. The method according to claim 1, wherein the multi-tenant database comprises one or more source databases for storing tenant data, the method further comprising:
   establishing mapping information pointing to the source databases;
   creating tenant-specific logic views for respective tenants based on the mapping information and multi-tenant metadata; and
   enabling database operations for at least one created tenant-specific logic view.

7. A system for manipulating a multi-tenant database, wherein the multi-tenant database comprises a plurality of source databases for storing tenant data corresponding to a plurality of tenants, the system comprising:
   a processor;
   a memory;
   a console database manager configured to establish in a console database mapping information pointing to the plurality of source databases; and
   a logic view generator configured to create a plurality of tenant-specific logic views each correspond to a respective tenant of the plurality of tenants based on the mapping information and multi-tenant metadata, and configured to enable a database operation for at least one created tenant-specific logic view, the system configured to:
      receive a database operation request via a tenant specific logic view of the plurality of tenant-specific logic views, wherein the tenant-specific logic view includes a respective trigger configured to convert the database operation request received via the tenant specific logic view into a two-segment type transaction for updating of a system table spanning multiple databases of the plurality of source databases;
      acquiring the mapping information related to the database operation request and pointing to the multiple databases of the plurality of source databases included in the multi-tenant database; and
      performing a database operation corresponding to the database operation request for the multiple databases of the plurality of source databases based on the acquired mapping information, wherein the performing comprises invoking the trigger.

8. The system according to claim 7, wherein the console database manager is configured to catalog each of the source databases and create the mapping information for the cataloged source database to establish a database federation.

9. The system according to claim 8, wherein the mapping information comprises table names of the database federation.

10. The system according to claim 7, wherein the multi-tenant metadata comprises correspondence relations of the tenants and one or more tables in the source database.

11. The system according to claim 7, wherein at least one of the source databases comprises a multi-tenant sharing table.

12. A computer program product for manipulating a multi-tenant database, wherein the multi-tenant database comprises a plurality of source databases for storing tenant data corresponding to a plurality of tenants, the computer program product comprising:
   a non-transitory computer readable storage medium having computer readable program code embodied therewith, the computer readable program code configured to:
      receiving a database operation request via a tenant specific logic view of a plurality of tenant-specific logic views, wherein the plurality of tenant-specific logic views each correspond to a respective tenant of the plurality of tenants based on mapping information pointing to the plurality of source databases included in the multi-tenant database and multi-tenant metadata, wherein the tenant-specific logic view includes a respective trigger configured to convert the database operation request received via the tenant specific logic view into a two-segment type transaction for updating of a system table spanning multiple databases of the plurality of source databases;
      acquiring the mapping information related to the database operation request and pointing to the multiple databases of the plurality of source databases included in the multi-tenant database; and
      performing a database operation corresponding to the database operation request for the multiple databases of the plurality of source databases based on the acquired mapping information, wherein the performing comprises invoking the trigger.

13. The computer program product according to claim 12, wherein the mapping information to the plurality of source databases is created by cataloging each of the source databases and creating the mapping information for the cataloged source database to establish a database federation.

14. The computer program product according to claim 13, wherein the mapping information comprises table nick names of the database federation.

15. The computer program product according to claim 12, wherein the multi-tenant metadata comprises correspondence relations of the tenants and one or more tables in the source database.

16. The computer program product according to claim 12, wherein at least one of the source databases comprises a multi-tenant sharing table.

17. The computer program product according to claim 12, wherein the multi-tenant database comprises one or more source databases for storing tenant data, and further comprising:
   establishing mapping information pointing to the source databases;
   creating tenant-specific logic views for respective tenants based on the mapping information and multi-tenant metadata; and
   enabling database operations for at least one created tenant-specific logic view.

* * * * *